(12) United States Patent
Cui et al.

(10) Patent No.: US 12,273,419 B2
(45) Date of Patent: Apr. 8, 2025

(54) METHOD, CLIENT, AND SYSTEM FOR ESTABLISHING P2P CONNECTION

(71) Applicant: SHANGHAI BILIBILI TECHNOLOGY CO., LTD., Shanghai (CN)

(72) Inventors: Honglei Cui, Shanghai (CN); Shunli Liang, Shanghai (CN); Hanchao Zheng, Shanghai (CN); Biao Hu, Shanghai (CN); Hao Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 90 days.

(21) Appl. No.: 18/271,013

(22) PCT Filed: Jan. 5, 2022

(86) PCT No.: PCT/CN2022/070236
§ 371 (c)(1),
(2) Date: Jul. 5, 2023

(87) PCT Pub. No.: WO2022/148361
PCT Pub. Date: Jul. 14, 2022

(65) Prior Publication Data
US 2024/0064206 A1    Feb. 22, 2024

(30) Foreign Application Priority Data

Jan. 6, 2021  (CN) .......................... 202110011856.9

(51) Int. Cl.
*H04L 67/141* (2022.01)
*H04L 61/2503* (2022.01)
*H04L 67/104* (2022.01)

(52) U.S. Cl.
CPC ........ *H04L 67/141* (2013.01); *H04L 61/2503* (2013.01); *H04L 67/104* (2013.01)

(58) Field of Classification Search
CPC .. H04L 67/104; H04L 67/141; H04L 61/2503
USPC ......................................................... 709/228
See application file for complete search history.

(56) References Cited

U.S. PATENT DOCUMENTS

| 8,874,785 B2 * | 10/2014 | Chaturvedi | ......... | H04L 61/2575 709/227 |
| 2004/0133689 A1 * | 7/2004 | Vasisht | ............... | H04L 41/0803 709/228 |

(Continued)

FOREIGN PATENT DOCUMENTS

| CN | 101217536 A | 7/2008 |
| CN | 102231763 A | 11/2011 |

(Continued)

OTHER PUBLICATIONS

Ford et al., Peer-to-Peer Communication Across Network Address Translators, Mar. 18, 2006, arXiv.org, 14 pages (Year: 2006).*

(Continued)

*Primary Examiner* — Quang N Nguyen
*Assistant Examiner* — Leon Y Tseng
(74) *Attorney, Agent, or Firm* — BakerHostetler

(57) ABSTRACT

This application provides techniques for establishing a P2P connection. The techniques comprise communicating with at least two auxiliary nodes to obtain answer messages returned by the at least two auxiliary nodes; determining, based on the answer messages, at least one public network address corresponding to an internal network address of a first client device; registering, with a cloud server, the at least one public network address corresponding to the internal network address of the first client device, and monitoring the at least one public network address corresponding to the (Continued)

internal network address of the first client device; and establishing a P2P connection to a second client device when detecting, in a preset duration, that the second client device returns a response data packet to a target public network address.

20 Claims, 7 Drawing Sheets

(56) References Cited

U.S. PATENT DOCUMENTS

2004/0148406 A1     7/2004   Shima
2022/0174032 A1*   6/2022   Zhu ....................... H04L 45/121

FOREIGN PATENT DOCUMENTS

| | | |
|---|---|---|
| CN | 103916382 A | 7/2014 |
| CN | 106331198 A | 1/2017 |
| CN | 106713437 A | 5/2017 |
| CN | 106878474 A | 6/2017 |
| CN | 107580081 A | 1/2018 |
| CN | 107580082 A | 1/2018 |
| CN | 112637364 A | 4/2021 |

OTHER PUBLICATIONS

International Patent Application No. PCT/CN2022/070236; Int'l Search Report; dated Mar. 30, 2022; 2 pages.

* cited by examiner

METHOD, CLIENT, AND SYSTEM FOR ESTABLISHING P2P CONNECTION

CROSS-REFERENCE TO RELATED APPLICATION

This application is the U.S. National Stage of International Application No. PCT/CN2022/070236, filed on Jan. 5, 2022, which claims priority to Chinese Patent Application No. 202110011856.9, filed on Jan. 6, 2021, and entitled "METHOD, CLIENT, AND SYSTEM FOR ESTABLISHING P2P CONNECTION", both of which are incorporated herein by reference in their entireties.

TECHNICAL FIELD

This application relates to the field of Internet technologies, and in particular, to a method for establishing a P2P connection. This application also relates to a client device, a system for establishing a P2P connection, a computing device, and a computer-readable storage medium.

BACKGROUND

With rapid development of Internet technologies, a quantity of client devices connected to the Internet rapidly increases. To facilitate interconnection of client devices, each client device may have a public network address of the client device. However, as a quantity of online client devices rapidly increases, a quantity of public network addresses that can be allocated is severely insufficient. To resolve the problem of public network address shortage, a network address translation (NAT) technology is introduced into the Internet.

The NAT technology is a technology for translating a private network address of an internal network into a public network address of an external network. There is a mapping table inside a NAT device, and this table stores a mapping relationship between the internal network and the external network. When any packet is sent from the internal network to the external network through the NAT device, one mapping relationship between the internal network and the external network is added to the mapping table of the NAT device. The mapping table is checked for any packet sent from the external network in the future. If there is a mapping relationship, an external network address of the packet is replaced with an internal network address.

However, an actual network environment is complex and changeable, and there are usually a plurality of public network addresses leading to the outside under a large local area network. These public network addresses are obtained through dynamic configuration, and each public network address corresponds to a plurality of port numbers. Therefore, it is difficult to implement hole punching between NAT devices with a plurality of public network addresses, and this undoubtedly impedes implementation of peer to peer (P2P) direct communication connection establishment.

SUMMARY

In view of this, an embodiment of this application provides a method for establishing a P2P connection. This application also relates to a client device, a system for establishing a P2P connection, a computing device, and a computer-readable storage medium, to resolve a problem in the conventional technology that it is difficult to implement hole punching between NAT devices with a plurality of public network IP addresses.

According to a first aspect of embodiments of this application, a method for establishing a P2P connection is provided. The method is applied to a first client device and includes:

communicating with at least two auxiliary nodes, to obtain answer messages returned by the at least two auxiliary nodes;

determining, based on the answer messages, at least one public network address corresponding to an internal network address of the first client device;

registering, with a cloud server, the at least one public network address corresponding to the internal network address of the first client device, and monitoring the at least one public network address corresponding to the internal network address of the first client device; and establishing a P2P connection to a second client device when detecting that the second client device returns a response data packet to a target public network address, where the target public network address is one of the at least one public network address corresponding to the internal network address of the first client device.

According to a second aspect of embodiments of this application, a method for establishing a P2P connection is provided, including:

a first client device and a second client device separately communicate with at least two auxiliary nodes, to obtain answer messages returned by the at least two auxiliary nodes, determine, based on the answer messages, at least one public network address corresponding to an internal network address of the first client device and at least one public network address corresponding to an internal network address of the second client device, register, with a cloud server, the at least one public network address corresponding to the internal network address of the first client device and the at least one public network address corresponding to the internal network address of the second client device, and monitor the at least one public network address;

the first client device obtains, by using the cloud server, the at least one public network address corresponding to the internal network address of the second client device, and sends an access request data packet to each of the at least one public network address corresponding to the internal network address of the second client device;

when detecting that a target public network address of the second client device receives the access request data packet, the second client device obtains, by using the cloud server, the at least one public network address corresponding to the internal network address of the first client device, and returns a response data packet to each of the at least one public network address corresponding to the internal network address of the first client device, where the target public network address is one of the at least one public network address corresponding to the internal network address of the second client device; and the first client device establishes a P2P connection to the second client device when detecting that the second client device returns the response data packet to a target public network address of the first client device, where the target public network address is one of the at least one public network address corresponding to the internal network address of the first client device.

According to a third aspect of embodiments of this application, a client device is provided, including:

a first obtaining module, configured to communicate with at least two auxiliary nodes, to obtain answer messages returned by the at least two auxiliary nodes;

a determining module, configured to determine, based on the answer messages, at least one public network address corresponding to an internal network address of a first client device;

a monitoring module, configured to register, with a cloud server, the at least one public network address corresponding to the internal network address of the first client device, and monitor the at least one public network address corresponding to the internal network address of the first client device; and a connection establishment module, configured to establish a P2P connection to a second client device when detecting that the second client device returns a response data packet to a target public network address, where the target public network address is one of the at least one public network address corresponding to the internal network address of the first client device.

According to a fourth aspect of embodiments of this application, a system for establishing a P2P connection is provided, including:

a first client device and a second client device, configured to: separately communicate with at least two auxiliary nodes, to obtain answer messages returned by the at least two auxiliary nodes; determine, based on the answer messages, at least one public network address corresponding to an internal network address of the first client device and at least one public network address corresponding to an internal network address of the second client device; and register, with a cloud server, the at least one public network address corresponding to the internal network address of the first client device and the at least one public network address corresponding to the internal network address of the second client device, and monitor the at least one public network address.

The first client device is further configured to obtain, by using the cloud server, the at least one public network address corresponding to the internal network address of the second client device, and send an access request data packet to each of the at least one public network address corresponding to the internal network address of the second client device.

The second client device is further configured to, when detecting that a target public network address of the second client device receives the access request data packet, obtain, by using the cloud server, the at least one public network address corresponding to the internal network address of the first client device, and return a response data packet to each of the at least one public network address corresponding to the internal network address of the first client device, where the target public network address is one of the at least one public network address corresponding to the internal network address of the second client device.

The first client device is further configured to establish a P2P connection to the second client device when detecting that the second client device returns the response data packet to a target public network address of the first client device, where the target public network address is one of the at least one public network address corresponding to the internal network address of the first client device.

According to a fifth aspect of embodiments of this application, a computing device is provided, including:

a memory and a processor, where the memory is configured to store computer-executable instructions, and the processor is configured to execute the computer-executable instructions to implement the following method:

communicating with at least two auxiliary nodes, to obtain answer messages returned by the at least two auxiliary nodes;

determining, based on the answer messages, at least one public network address corresponding to an internal network address of a first client device;

registering, with a cloud server, the at least one public network address corresponding to the internal network address of the first client device, and monitoring the at least one public network address corresponding to the internal network address of the first client device; and establishing a P2P connection to a second client device when detecting that the second client device returns a response data packet to a target public network address, where the target public network address is one of the at least one public network address corresponding to the internal network address of the first client device.

According to a sixth aspect of embodiments of this application, a computer-readable storage medium is provided. The computer-readable storage medium stores computer-executable instructions. When the instructions are executed by a processor, any of the steps of the method for establishing a P2P connection in the first aspect is implemented.

According to the method for establishing a P2P connection provided in this application, a first client device may communicate with at least two auxiliary nodes, to obtain answer messages returned by the at least two auxiliary nodes; then, the first client device determines, based on the answer messages, at least one public network address corresponding to an internal network address of the first client device, registers, with a cloud server, the at least one public network address corresponding to the internal network address of the first client device, and monitors the at least one public network address corresponding to the internal network address of the first client device; and when detecting that a second client device returns a response data packet to a target public network address, the first client device establishes a P2P connection to the second client device, where the target public network address is one of the at least one public network address corresponding to the internal network address of the first client device. In this case, the at least one public network address corresponding to the internal network address of the first client device may be detected through communication between the first client device and the at least two auxiliary nodes, to determine whether there are a plurality of external public network addresses of the first client device. That is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

DESCRIPTION OF EMBODIMENTS

Figure 1:
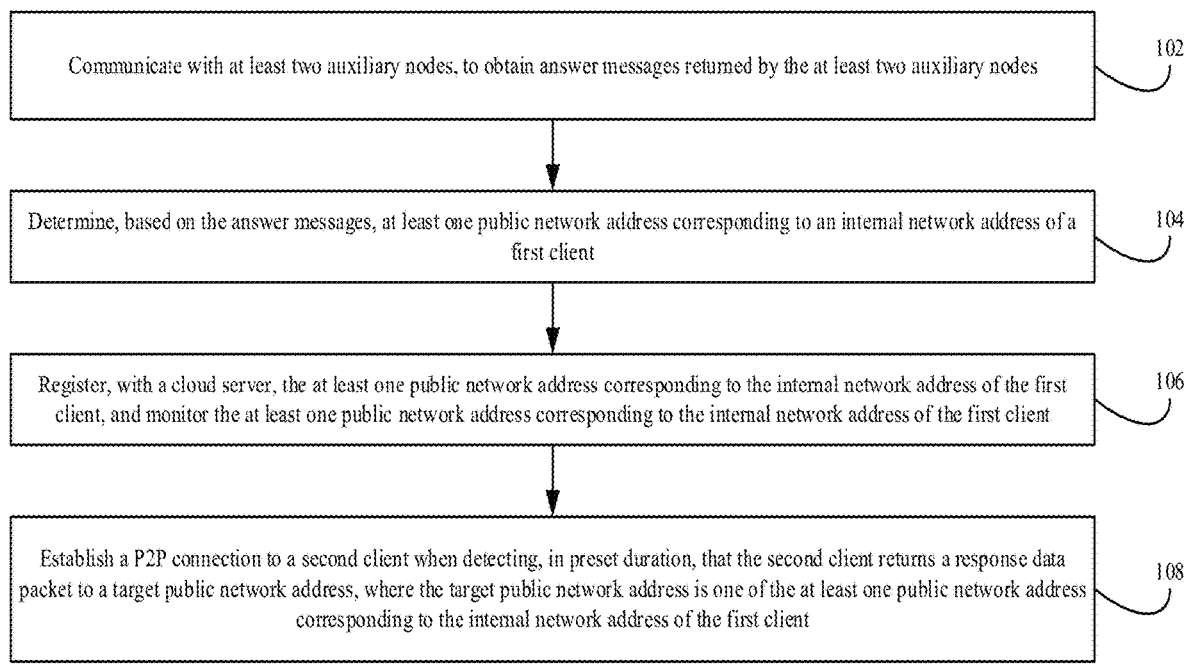
FIG. 1 is a flowchart of a method for establishing a P2P connection according to an embodiment of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "one", "the" and "this" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although the terms such as "first" and "second" may be used in one or more embodiments of this application to describe various types of information, the information is not limited to these terms. These terms are only used to distinguish between information of a same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are first explained.

Internet protocol address (IP address): An IP address is also translated into a network protocol address, is a uniform address format provided by an IP protocol, and allocates a logical address to each network and each host on the Internet to shield a difference between physical addresses.

Network address translation (NAT): Some hosts in a private network are already assigned with local IP addresses (that is, private addresses used in the private network), but the hosts can also use a NAT method when communicating with a host on the Internet (no encryption is required). This method has at least one valid external global IP address, namely, a public network address. In this way, when communicating with the outside world, all hosts that use local addresses need to translate their local addresses into public network addresses on a NAT device to connect to the Internet.

NAT devices may be classified into three types based on functions: static NAT, dynamic NAT, and terminal network address port translation (NAPT). The static NAT is relatively simple. The dynamic NAT means that a one-to-one fixed correspondence between an internal address and a global address is not established, but a mapping relationship of NAT is dynamically established by using an IP address of a shared NAT address pool. The NAPT is the most common NAT and the most widely studied NAT type in academic circles. The NAPT maps an internal network connection to a separate IP address in an external network, and adds a port number selected by a NAT device to the address. The NAPT includes four types: a full cone type, an IP restricted cone type, a port restricted cone type, and a symmetric type.

Full cone NAT: Once an internal host port pair (iAddr: iPort) is mapped to (eAddr:ePort) by a NAT gateway, all subsequent (iAddr:iPort) packets are converted into (eAddr: ePort); and a packet sent by any external host to the (eAddr:ePort) is sent to the (iAddr:iPort) after conversion.

IP restricted cone NAT: Once an internal host port pair (iAddr:iPort) is mapped to (eAddr:ePort), all subsequent (iAddr:iPort) packets are converted into (eAddr:ePort); and only the (iAddr:iPort) has sent data to a specific external host hAddr, and a packet sent by the host hAddr from any port to the (eAddr:ePort) is forwarded to the (iAddr:iPort).

Port restricted cone NAT: Once an internal host port pair (iAddr:iPort) is mapped to (eAddr:ePort), all subsequent (iAddr:iPort) packets are converted into (eAddr:ePort); and only the (iAddr:iPort) has sent data to a specific external host port pair (hAddr:hPort), and a packet sent by the (hAddr: hPort) to the (eAddr:ePort) is forwarded to the (iAddr:iPort).

Symmetric NAT: A NAT gateway regards identical packets of an internal host "address port pair" and an external host "address port pair" as a connection, a public network "address port pair" mapping is created on the gateway to perform conversion, only a response packet sent from a corresponding port pair by an external host that receives a packet can be converted, and even if an internal host uses a previously used address port pair to connect to different external hosts (or ports), the NAT gateway also establishes a new mapping relationship.

Hole punching server: A hole punching server is a STUN server. A user datagram protocol (UDP) simply traverses network address translators (NAT), and allows client devices (such as computers on the back of a firewall) corresponding to all NAT devices to implement telephone conversations with a VOIP service provider located outside a local area network. Through the STUN server, the client devices can know their public network addresses, types of the NATs in front of the client devices, and Internet ports connected to specific local ports through the NATs. This information is used to establish UDP communication between the client devices and the VOIP service provider, to implement the conversations.

In this application, a method for establishing a P2P connection is provided. This application also relates to a client device, a system for establishing a P2P connection, a computing device, and a computer-readable storage medium. Details are described one by one in the following embodiments.

FIG. 1 is a flowchart of a method for establishing a P2P connection according to an embodiment of this application. The method is applied to a first client device and specifically includes the following steps.

Step 102: Communicate with at least two auxiliary nodes, to obtain answer messages returned by the at least two auxiliary nodes.

In actual application, an actual network environment is complex and changeable, and there are usually a plurality of public network addresses leading to the outside under a large local area network. These public network addresses are obtained through dynamic configuration, and each public network address corresponds to a plurality of port numbers. Therefore, it is difficult to implement hole punching between NAT devices with a plurality of public network addresses, and this undoubtedly impedes implementation of peer to peer (P2P) direct communication connection establishment.

Therefore, this application provides a method for establishing a P2P connection. A first client device may communicate with at least two auxiliary nodes, to obtain answer messages returned by the at least two auxiliary nodes; then, the first client device determines, based on the answer messages, at least one public network address corresponding to an internal network address of the first client device, registers, with a cloud server, the at least one public network address corresponding to the internal network address of the first client device, and monitors the at least one public network address corresponding to the internal network address of the first client device; and when detecting that a second client device returns a response data packet to a target public network address, the first client device establishes a P2P connection to the second client device, where the target public network address is one of the at least one public network address corresponding to the internal network address of the first client device. In this case, whether there are a plurality of public network addresses corresponding to the internal network address of the first client device may be detected through communication between the first client device and the at least two auxiliary nodes, that is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

Specifically, an auxiliary node may be a full cone NAT device or a public network node, so that other types of nodes each may establish a connection to the auxiliary node, to detect a public network address, where the public network address may include a public network IP address and a public network port. In a specific implementation, the first client device may obtain the at least two auxiliary nodes from the cloud server, where the cloud server is a node scheduling server, and all nodes keep signaling interaction with the cloud server. It should be noted that, a larger quantity of auxiliary nodes indicates that detected public network addresses are more comprehensive and accurate. In this application, a quantity of auxiliary nodes is not limited, and may be set according to a specific requirement in actual application.

It should be noted that the first client device includes a terminal device waiting to establish a P2P connection and a corresponding NAT device. The terminal device interacts with the outside by using the corresponding NAT device, and the NAT device may translate an internal network address of the terminal device into an external public network address, so that the terminal device interacts with the outside.

In addition, the second client device that needs to establish a P2P connection to the first client device may perform a same operation as the first client device. To be specific, the second client device may also communicate with the at least two auxiliary nodes to obtain answer messages returned by the at least two auxiliary nodes, to determine at least one public network address corresponding to an internal network address of the second client device, so that the at least one public network address corresponding to the internal network address of the second client device is subsequently exchanged with the at least one public network address corresponding to the internal network address of the first client device, to establish a P2P connection to the first client device.

In an optional implementation of this embodiment, before the first client device detects the corresponding public network address by using the auxiliary nodes, the first client device may further perform detection by using a traversal auxiliary server, to obtain a NAT type of the corresponding NAT device of the first client device. Therefore, before that the first client device communicates with at least two auxiliary nodes, to obtain answer messages returned by the at least two auxiliary nodes, the method further includes:

communicating with the traversal auxiliary server, to obtain the internal network address and the NAT type of the corresponding NAT device; and locally storing the internal network address and the NAT type of the corresponding NAT device.

It should be noted that the traversal auxiliary server refers to a hole punching server, namely, a STUN server. Detection of a public network address of the NAT device includes conventional NAT detection and NAT detection that is performed by using an auxiliary node. The conventional NAT detection means that the first client device communicates with the traversal auxiliary server, and an internal network and public network address pair (IP_A, Port_A: IP_A', Port_A') currently used for communication may be obtained, to preliminarily determine the NAT type.

In an optional implementation of this embodiment, a specific implementation process of the communicating with at least two auxiliary nodes, to obtain answer messages returned by the at least two auxiliary nodes may be as follows:

sending a detection assistance request to the at least two auxiliary nodes by using the internal network address of the first client device; and receiving the answer messages returned by the at least two auxiliary nodes in response to the detection assistance request.

It should be noted that, as a supplement to the conventional NAT detection, the detection may be further performed by using auxiliary nodes. The first client device may first randomly obtain, from the cloud server, at least two auxiliary nodes distributed in different locations; then, the first client device communicates with the obtained auxiliary nodes by using the internal network address (IP_A, Port_A) that previously communicates with the hole punching server; and after receiving the answer messages of these auxiliary nodes, the first client device may record a public network IP address and a public network port (namely, a public network address) that are connected to these auxiliary nodes.

Figure 2:
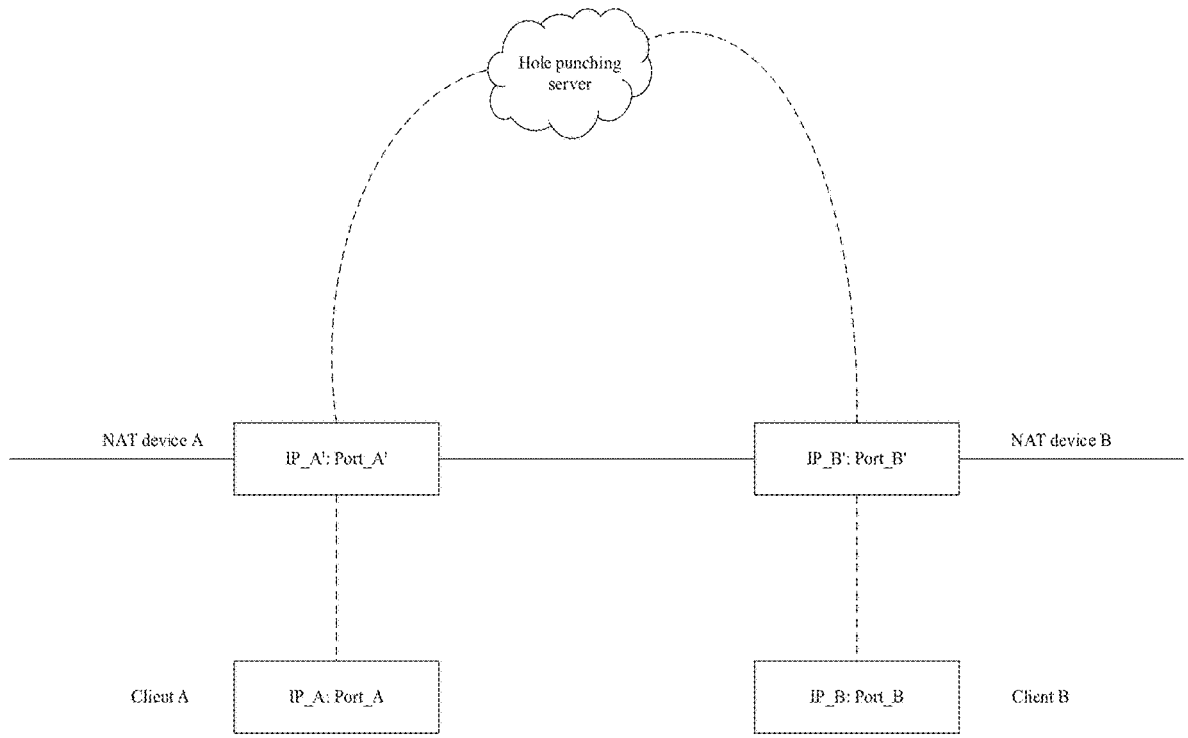
FIG. 2 is a schematic diagram of conventional NAT detection according to an embodiment of this application.

For example, FIG. 2 is a schematic diagram of conventional NAT detection according to an embodiment of this application. As shown in FIG. 2, a client device A translates an internal network IP address and an internal network port (IP_A: Port_A) into a public network IP address and a public network port (IP_A': Port_A') through a corresponding NAT device A to communicate with a hole punching server, and registers, with the hole punching server, a type of a NAT device of the client device A, a corresponding public network IP address, and a public network port. Correspondingly, a client device B translates an internal network IP address and an internal network port (IP_B: Port_B) into a public network IP address and a public network port (IP_B': Port_B') through a corresponding NAT device B to communicate with the hole punching server, and registers, with the hole punching server, a type of a NAT device of the client device B, a corresponding public network IP address, and a public network port.

Step 104: Determine, based on the answer messages, the at least one public network address corresponding to the internal network address of the first client device.

Specifically, on the basis of the communicating with at least two auxiliary nodes, to obtain answer messages returned by the at least two auxiliary nodes, the at least one public network address corresponding to the internal network address of the first client device is further determined based on the answer messages. The public network address may include a public network IP address and a public network port.

It should be noted that the determining, based on the answer messages, a public network address corresponding to the internal network address of the first client device is roughly divided into three cases. Case 1: Public network IP addresses are different, and corresponding port mappings from an internal network to a public network are specific. Case 2: When communicating with different auxiliary nodes, a port changes in an up-down small range of an original position. Case 3: There are a plurality of public network IP addresses, and ports that pass through the public network IP addresses also change.

Figure 3:
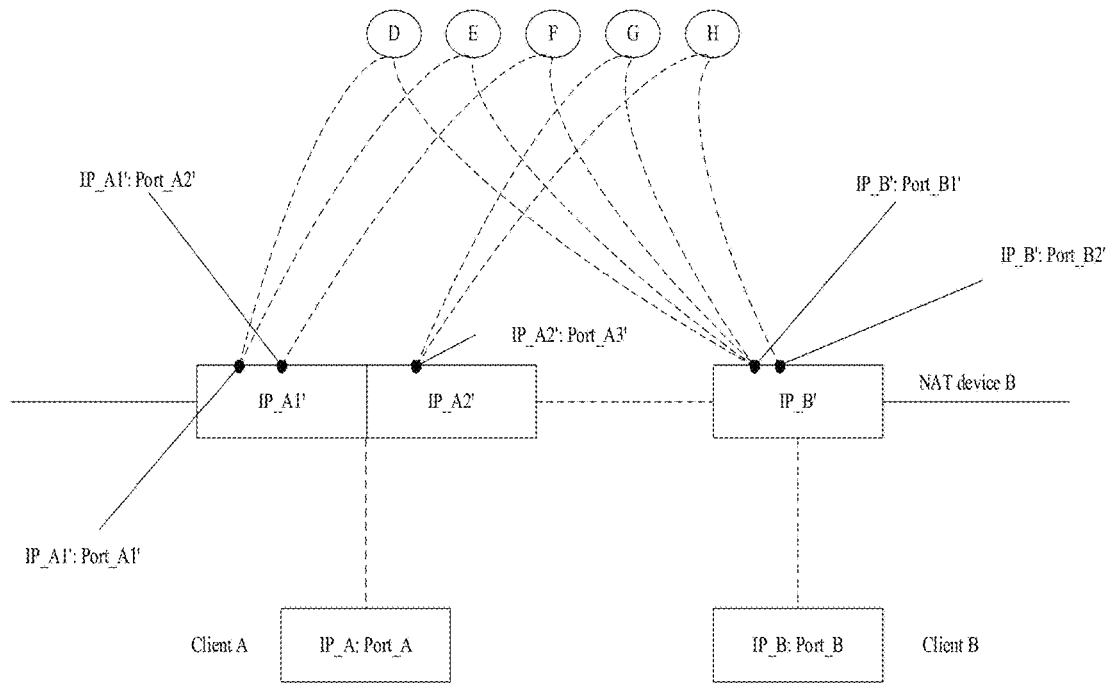
FIG. 3 is a schematic diagram of a public network address according to an embodiment of this application.

For example, FIG. 3 is a schematic diagram of a public network address according to an embodiment of this application. As shown in FIG. 3, a client device A separately communicates with auxiliary nodes D, E, F, G, and H by using an internal network address (IP_A: Port_A). It can be learned, based on answer messages returned by the auxiliary nodes, that a public network IP address communicating with the auxiliary nodes D, E, and F is IP_A1' and a public network IP address communicating with the auxiliary nodes G and H is IP_A2'. That is, a NAT device A corresponding to the client device A maps an internal network IP address IP_A of the client device A to the public network IP address IP_A1' or IP_A2' (a port is not limited).

If the NAT device A corresponding to the client device A is a port restricted cone NAT device, the client device A separately communicates with the auxiliary nodes D, E, F, G, and H by using the internal network address (IP_A: Port_A). It can be learned, based on the answer messages returned by the auxiliary nodes, that the public network IP address communicating with the auxiliary nodes D, E, and F is IP_A1', a public network port communicating with the auxiliary nodes D and E is Port_A1', and a public network port communicating with the auxiliary node F is Port_A2'; and public network IP addresses communicating with the auxiliary nodes G and H each are IP_A2', and public network ports communicating with the auxiliary nodes G and H each are Port_A3'. That is, the NAT device A corresponding to the client device A maps the internal network address (IP_A: Port_A) of the client device A to a public network address (IP_A1': Port_A1'), (IP_A1': Port_A2'), or (IP_A2': Port_A3').

If a NAT device corresponding to a client device B is a port restricted cone NAT device, the client device B separately communicates with the auxiliary nodes D, E, F, G, and H by using an internal network address (IP_B: Port_B). It can be learned, based on answer messages returned by the auxiliary nodes, that public network IP addresses communicating with the auxiliary nodes D, E, F, G, and H each are IP_B', but a public network port communicating with the auxiliary nodes D, E, F, and G is Port_B1', and a public network port communicating with the auxiliary node H is Port_B2'. That is, the NAT device B corresponding to the client device B maps the internal network address (IP_B: Port_B) of the client device B to a public network address (IP_B': Port_B1') or (IP_B': Port_B2').

In an optional implementation of this embodiment, a specific implementation process of the determining, based on the answer messages, the at least one public network address corresponding to the internal network address of the first client device may be as follows:

when the NAT type of the NAT device corresponding to the first client device is a port restricted cone, determining, based on the answer messages, at least one public network IP address corresponding to the internal network address of the first client device;

determining, for each of the at least one public network IP address, at least one public network port corresponding to the public network IP address; determining, based on the at least one public network port, an estimated public network port corresponding to the public network IP address; and combining the estimated public network port and the public network IP address into the public network address.

It should be noted that, if the NAT type of the NAT device corresponding to the first client device is a port restricted cone, it indicates that the first client device restricts a port when interacting with the outside by using the corresponding NAT device. Therefore, at least one public network port corresponding to each public network IP address needs to be determined, and then the public network IP address and the at least one corresponding public network port are determined as one public network address, to obtain at least one public network address. Subsequently, an access request data packet may be sent based on the at least one public network address, to establish a P2P connection.

In an optional implementation of this embodiment, a specific implementation process of the determining, based on the at least one public network port, an estimated public network port corresponding to the public network IP address may be as follows:

determining a first public network port with a largest port identifier and a second public network port with a smallest port identifier in the at least one public network port;

determining a start port identifier and an end port identifier based on the first public network port and the second public network port; and determining a public network port between the start port identifier and the end port identifier as the estimated public network port.

In an optional implementation of this embodiment, a specific implementation process of the determining a start port identifier and an end port identifier based on the first public network port and the second public network port may be as follows:

adding a preset threshold to the port identifier of the first public network port, to obtain the end port identifier; and subtracting the preset threshold from the port identifier of the second public network port, to obtain the start port identifier.

Specifically, the preset threshold may be preset, for example, may be 20, 30, or 40.

It should be noted that, because a quantity of auxiliary nodes is limited, it is difficult to determine all public network ports corresponding to the public network IP address of the first client device by using the auxiliary nodes. Therefore, after at least one public network port corresponding to the public network IP address is determined by using the auxiliary nodes, another public network port corresponding to the public network IP address may be further predicted based on the determined at least one public network port, so that the estimated public network port is determined as a public network address corresponding to the internal network address of the first client device.

In addition, the at least one public network port determined by using the auxiliary nodes is only a public network port used when the first client device interacts with a corresponding auxiliary node, and a public network port near these public network ports may be a public network port for subsequently performing a hole punching operation. Therefore, the start port identifier and the end port identifier may be determined based on the at least one public network port returned by the auxiliary nodes, and ports that are consecutive between the start port identifier and the end port identifier may be determined as estimated public network ports corresponding to the public network IP address, to further determine a corresponding public network address.

For example, it is assumed that public network IP addresses determined by the first client device by using at least two auxiliary nodes are IP_A, IP_B, and IP_C. For IP_A, assuming that corresponding public network ports determined by using the auxiliary nodes are a port 1121, a port 1123, and a port 1125, and the preset threshold is 20, the start port identifier is 1101 and the end port identifier is 1145. In this case, a port between 1101 and 1145 is determined as an estimated public network port, and IP_A and the port between 1101 and 1145 are determined as a public network address. For IP_B and IP_C, a public network address corresponding to IP_B and a public network address corresponding to IP_C may be separately obtained by performing a same operation. Therefore, three public network addresses corresponding to the internal network address of the first client device are finally obtained.

In an optional implementation of this embodiment, the determining, based on the answer messages, at least one public network IP address corresponding to the internal network address of the first client device includes:

determining, for each of the at least two auxiliary nodes, a public network IP address corresponding to the answer message returned by the auxiliary node; and performing a deduplication operation on the public network IP address corresponding to the answer message, to determine the at least one public network IP address corresponding to the internal network address of the first client device.

In actual application, after receiving the answer messages of these auxiliary nodes, the first client device (or the second client device) may record public network IP addresses connected to these auxiliary nodes, and then analyze a series of obtained public network IP addresses. If all public network IP addresses are displayed as a same address, a result is the same as that of conventional NAT detection. That is, the NAT device corresponding to the first client device (or the second client device) maps the internal network address of the first client device to a public network IP address, and the first client device subsequently establishes a connection to another client device by using the public network IP address.

If it is determined, based on the answer messages, that there are a plurality of public network IP addresses (that is, the obtained public network IP addresses are different) corresponding to the internal network address of the first client device, that is, the NAT device corresponding to the first client device (or the second client device) maps the internal network address of the first client device to a plurality of public network IP addresses, the plurality of corresponding public network IP addresses may be recorded in a data structure of a local client device. That is, a deduplication operation is performed on the public network IP address corresponding to the answer message, to determine the at least one public network IP address corresponding to the internal network address of the first client device.

In addition, if the NAT type of the NAT device corresponding to the first client device is not a port restricted cone, it indicates that the NAT device corresponding to the first client device has no limitation on a port, only public network IP addresses need to be deduplicated based on the answer messages returned by the at least two auxiliary nodes to obtain a public network address, and there is no need to further determine a public network port.

In this application, the first client device and the second client device may separately communicate with the at least two auxiliary nodes to obtain the answer messages returned by the at least two auxiliary nodes, to determine a public network IP address and a public network port (namely, a public network address) of the NAT device corresponding to the first client device and those of the NAT device corresponding to the second client device. That is, a plurality of public network addresses and public network ports corresponding to the internal network address of the first client device and those corresponding to the internal network address of the second client device can be more accurately detected by using the at least two auxiliary nodes, so that a success rate of hole punching between client devices corresponding to a plurality of public network addresses is improved, and P2P connection establishment with a high success rate is implemented.

Step 106: Register, with the cloud server, the at least one public network address corresponding to the internal network address of the first client device, and monitor the at least one public network address corresponding to the internal network address of the first client device.

Specifically, on the basis of determining, based on the answer messages, the at least one public network address corresponding to the internal network address of the first client device, the at least one public network address corresponding to the internal network address of the first client device may be further registered with the cloud server and monitored. The cloud server is a server that manages and controls the at least two auxiliary nodes.

In an optional implementation of this embodiment, the registering, with the cloud server, the at least one public network address corresponding to the internal network address of the first client device includes:

registering, with the cloud server, the at least one public network address corresponding to the internal network address of the first client device and the NAT type of the corresponding NAT device.

It should be noted that because different types of NAT devices require different ports, the first client device may further detect the type of the NAT device of the first client device by using a traversal auxiliary server (namely, a hole punching server), and then register the type with the cloud server for obtaining by the second client device. Correspondingly, the second client device may perform the same operation as the first client device, and register a NAT type of the second client device with the cloud server for obtaining by the first client device.

To be specific, after separately performing NAT detection by using at least two auxiliary nodes, the first client device and the second client device each may obtain each public network IP address, each public network port, and a corresponding NAT type that correspond to the internal network address and are registered with the cloud server in a form of a data stream, and the first client device and the second client device exchange respective registered information with peer ends through the cloud server, so that the first client device can obtain the public network IP address and the public network port of the second client device, to establish a P2P connection.

It should be noted that the second client device that needs to establish a P2P connection to the first client device may perform the same operation as the first client device. To be specific, the second client device may also perform the steps 102 to 106, to determine the at least one public network address and the NAT type that correspond to the internal network address of the second client device, and register with the cloud server, so that the second client device can subsequently exchange the at least one public network address and the NAT type with the at least one public network address and the NAT type that correspond to the internal network address of the first client device, to establish a P2P connection to the first client device.

In an optional implementation of this embodiment, after the first client device and the second client device respectively register, with the cloud server, the at least one public network address corresponding to the internal network address of the first client device and the at least one public network address corresponding to the internal network address of the second client device, the first client device may obtain, from the cloud server, the at least one public network address corresponding to the internal network address of the second client device, to establish a P2P connection to the second client device. To be specific, after the registering, with the cloud server, the at least one public network address corresponding to the internal network address of the first client device, the method further includes:

obtaining, by using the cloud server, the at least one public network address corresponding to the internal network address of the second client device, where the at least one public network address corresponding to the internal network address of the second client device is a public network address determined by the second client device by using the at least two auxiliary nodes; and sending an access request data packet to each of the at least one public network address corresponding to the internal network address of the second client device.

Specifically, the access request data packet may be a hole punching data packet. In addition, the at least one public network address that corresponds to the internal network address of the second client device and that is obtained by the first client device from the cloud server is the public network address that is determined by the second client device by using the auxiliary nodes through the foregoing method steps 102 to 106.

It should be noted that after obtaining, by using the cloud server, the at least one public network address corresponding to the internal network address of the second client device, the first client device may send the access request data packet to each of the at least one public network address corresponding to the internal network address of the second client device. Correspondingly, the second client device may monitor each public network address of the second client device. If it is detected that any public network address of the second client device receives the access request data packet sent by the first client device, the second client device may obtain, by using the cloud server, the at least one public network address corresponding to the internal network address of the first client device, and then return a response data packet to each of the at least one public network address corresponding to the internal network address of the first client device.

In an optional implementation of this embodiment, a public network address includes one public network IP address and at least one public network port, and the sending an access request data packet to each of the at least one public network address corresponding to the internal network address of the second client device includes:

obtaining, by using the cloud server, a NAT type of a NAT device corresponding to the second client device;

when the NAT type is a port restricted cone, determining, for each of the at least one public network address, a quantity of public network ports included in the public network address;

when the public network address includes at least two public network ports, forming at least two address port pairs by using each of the at least two public network ports and the public network IP address that are included in the public network address; and sending the access request data packet to each of the address port pairs.

In actual application, if there are a plurality of obtained public network addresses corresponding to the internal network address of the second client device, it indicates that there are a plurality of public network addresses determined by the second client device by using the auxiliary nodes. That is, the NAT device corresponding to the second client device maps the internal network address of the second client device to a plurality of public network addresses. In other words, the second client device may establish a connection to the first client device by using any one of the plurality of public network addresses. Therefore, when determining that there are a plurality of obtained public network addresses corresponding to the internal network address of the second client device, the first client device needs to send an access request data packet to each of the plurality of public network addresses.

In addition, when the NAT type of the NAT device corresponding to the second client device is a port restricted cone, a quantity of public network ports included in each of the at least one obtained public network address corresponding to the internal network address of the second client device may be determined. If the public network address includes one public network port, one public network IP address and the public network port that are included in the public network address are directly formed into an address port pair, and an access request data packet is sent to the address port pair. If the public network address includes at least two public network ports, at least two address port pairs are formed by using each of the at least two public network ports and one public network IP address that are included in the public network address, and then the access request data packet is sent to each address port pair.

In an optional implementation of this embodiment, the obtaining, by using the cloud server, the at least one public network address corresponding to the internal network address of the second client device includes:

sending a connection establishment assistance request to the cloud server; and receiving at least one public network address that corresponds to the internal network address of the second client device and that is returned by the cloud server in response to the connection establishment assistance request.

It should be noted that the first client device may send the connection establishment assistance request to the cloud server. The connection establishment assistance request may carry an identifier of the second client device. After receiving the connection establishment assistance request, the cloud server returns, to the first client device, the at least one public network address that corresponds to the internal network address of the second client device and that is registered with the cloud server by the second client device.

Step 108: Establish a P2P connection to the second client device when detecting, in preset duration, that the second client device returns a response data packet to a target public network address, where the target public network address is one of the at least one public network address corresponding to the internal network address of the first client device.

Specifically, the preset duration is timeout duration, and within the preset duration means within a timeout range. The preset duration may be preset to, for example, 1 minute, 5 minutes, or 10 minutes. The response data packet is a hole punching data packet returned by the second client device to the first client device, and is used to establish a P2P connection.

It should be noted that if the second client device detects that any public network address of the second client device receives the access request data packet sent by the first client device, the second client device may obtain, by using the cloud server, the at least one public network address corresponding to the internal network address of the first client device, and return a response data packet to each of the at least one public network address corresponding to the internal network address of the first client device. In other words, the first client device may monitor each public network address corresponding to the internal network address of the first client device. If it is detected that any public network address of the first client device receives the response data packet returned by the second client device, it indicates that the second client device successfully receives the access request data packet sent by the first client device, and successfully returns the response data packet to the first client device. In this case, the first client device may establish a P2P connection to the second client device.

In addition, if the first client device keeps monitoring the at least one public network address corresponding to the internal network address of the first client device, a large quantity of processing resources are wasted. If the first client device does not detect for a long time that the second client device returns a response data packet to any public network address of the first client device, it indicates that the second client device fails to receive the access request data packet sent by the first client device, or fails to return a response data packet to a correct public network address of the first client device. Therefore, preset duration may be set. If after a time period greater than the preset duration, the first client device fails to detect that the second client device returns a response data packet to any public network address of the first client device, it indicates that the first client device and the second client device fail to establish a P2P connection, and monitoring is stopped.

Figure 4:
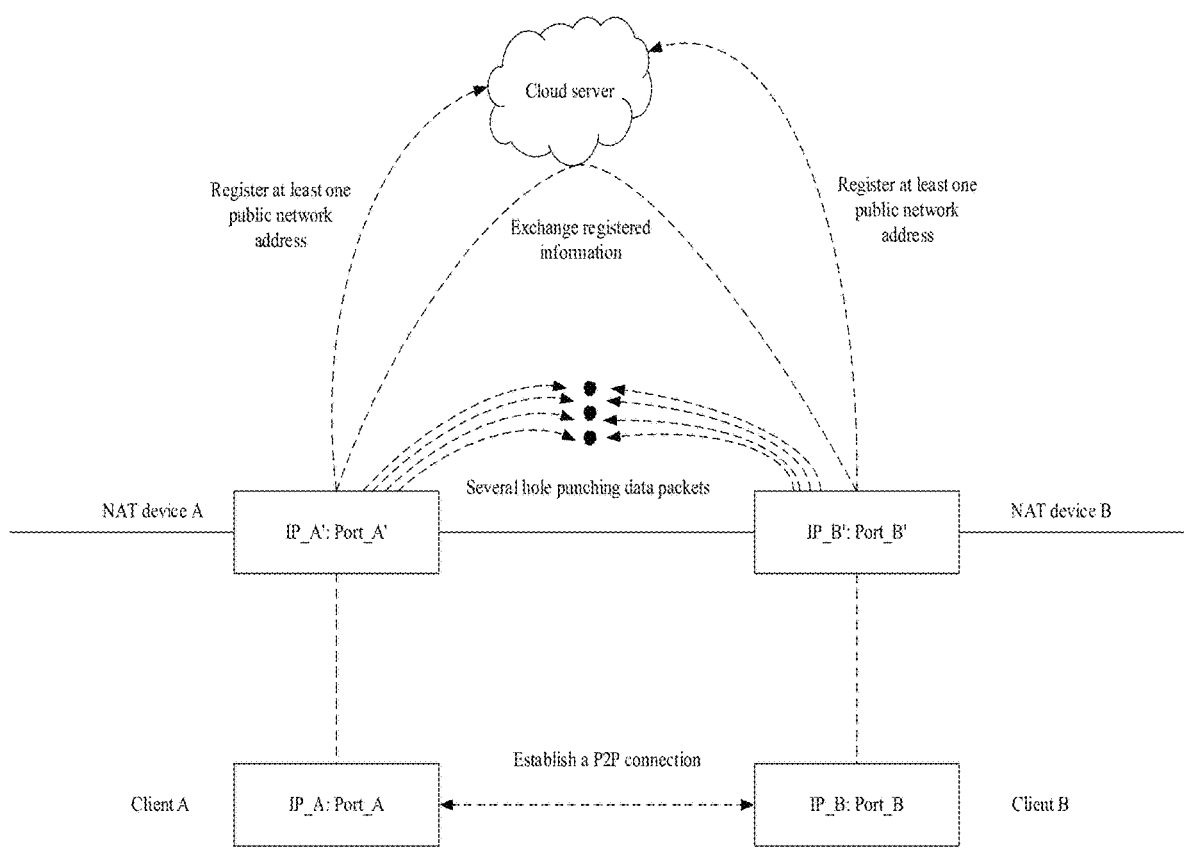
FIG. 4 is a schematic diagram of establishing a P2P connection according to an embodiment of this application.

For example, FIG. 4 is a schematic diagram of establishing a P2P connection according to an embodiment of this application. As shown in FIG. 4, a client device A and a client device B respectively register, with the cloud server, at least one public network address that is of the client device A and that is determined by using an auxiliary node and at least one public network address that is of the client device B and that is determined by using an auxiliary node, and then the client device A and the client device B exchange registered information. Then, the client device A sends several hole punching data packets based on at least one obtained public network address of the peer end. The client device B returns several hole punching data packets based on at least one obtained public network address of the peer end. If the first client device receives the hole punching data packet returned by the second client device within the timeout range, the first client device establishes a P2P connection to the second client device; otherwise, it is determined that the P2P connection establishment fails.

According to the method for establishing a P2P connection provided in this application, a first client device may communicate with at least two auxiliary nodes, to obtain answer messages returned by the at least two auxiliary nodes; then, the first client device determines, based on the answer messages, at least one public network address corresponding to an internal network address of the first client device, registers, with a cloud server, the at least one public network address corresponding to the internal network address of the first client device, and monitors the at least one public network address corresponding to the internal network address of the first client device; and when detecting that a second client device returns a response data packet to a target public network address, the first client device establishes a P2P connection to the second client device, where the target public network address is one of the at least one public network address corresponding to the internal network address of the first client device. In this case, the at least one public network address corresponding to the internal network address of the first client device may be detected through communication between the first client device and the at least two auxiliary nodes, to determine whether there are a plurality of external public network addresses of the first client device. That is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

Figure 5:
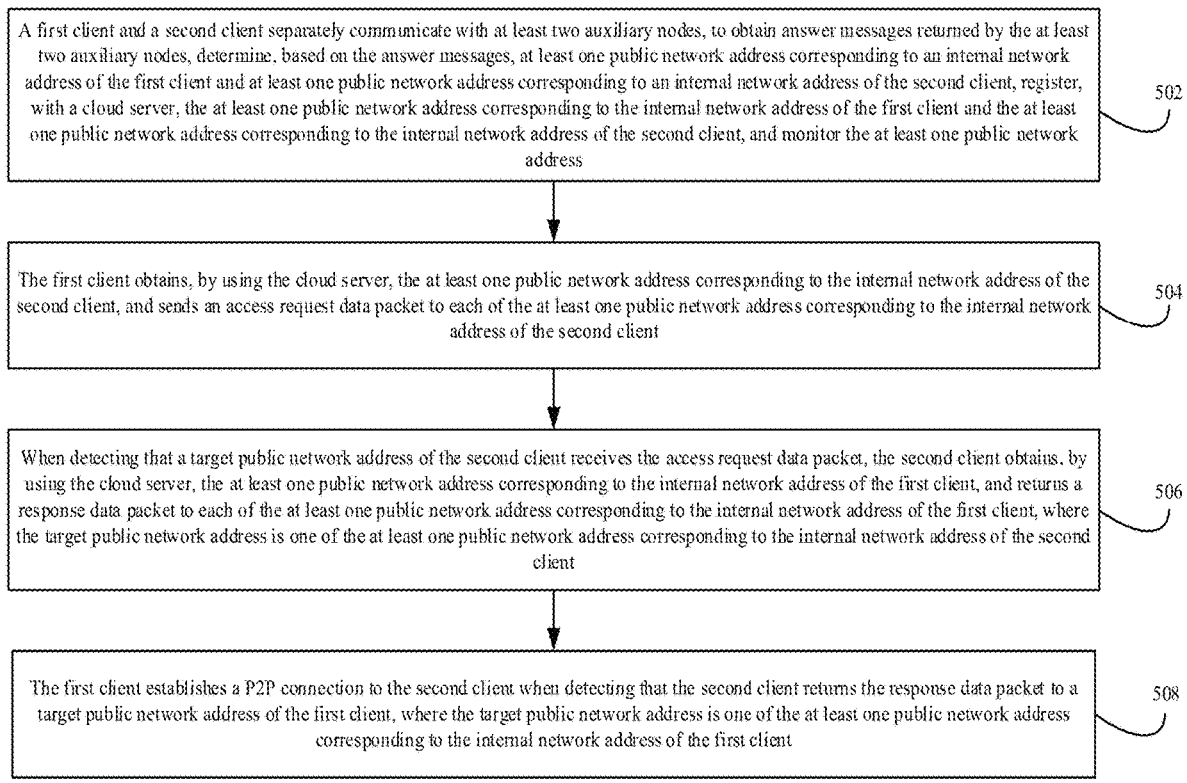
FIG. 5 is a flowchart of another method for establishing a P2P connection according to an embodiment of this application.

FIG. 5 is a flowchart of another method for establishing a P2P connection according to an embodiment of this application. The method specifically includes the following steps.

Step 502: A first client device and a second client device separately communicate with at least two auxiliary nodes, to obtain answer messages returned by the at least two auxiliary nodes, determine, based on the answer messages, at least one public network address corresponding to an internal network address of the first client device and at least one public network address corresponding to an internal network address of the second client device, register, with a cloud server, the at least one public network address corresponding to the internal network address of the first client device and the at least one public network address corresponding to the internal network address of the second client device, and monitor the at least one public network address.

In an optional implementation of this embodiment, before that a first client device and a second client device separately communicate with at least two auxiliary nodes, to obtain answer messages returned by the at least two auxiliary nodes, the method further includes:

the first client device and the second client device separately communicate with a traversal auxiliary server, to obtain the internal network address of the first client device, the internal network address of the second client device, a NAT type of a NAT device corresponding to the first client device, and a NAT type of a NAT device corresponding to the second client device; and the first client device and the second client device locally store the respective internal network addresses and the NAT types of the corresponding NAT devices.

In an optional implementation of this embodiment, a specific implementation process in which the first client device determines, based on the answer messages, the at least one public network address corresponding to the internal network address of the first client device may be as follows:

when the NAT type of the NAT device corresponding to the first client device is a port restricted cone, determining, based on the answer messages, at least one public network IP address corresponding to the internal network address of the first client device;

determining, for each of the at least one public network IP address, at least one public network port corresponding to the public network IP address; determining, based on the at least one public network port, an estimated public network port corresponding to the public network IP address; and combining the estimated public network port and the public network IP address into the public network address.

Correspondingly, that the second client device determines, based on the answer message, the at least one public network address corresponding to the internal network address of the second client device is the same as the operation of the first client device, and is specifically as follows:

when the NAT type of the NAT device corresponding to the second client device is a port restricted cone, determining, based on the answer messages, at least one public network IP address corresponding to the internal network address of the second client device;

determining, for each of the at least one public network IP address, at least one public network port corresponding to the public network IP address; determining, based on the at least one public network port, an estimated public network port corresponding to the public network IP address; and combining the estimated public network port and the public network IP address into the public network address.

In an optional implementation of this embodiment, that the first client device and the second client device respectively register, with a cloud server, the at least one public network address corresponding to the internal network address of the first client device and the at least one public network address corresponding to the internal network address of the second client device includes:

registering, with the cloud server, the at least one public network address corresponding to the internal network address of the first client device, the at least one public network address corresponding to the internal network address of the second client device, the NAT type of the NAT device corresponding to the first client device, and the NAT type of the NAT device corresponding to the second client device.

Step 504: The first client device obtains, by using the cloud server, the at least one public network address corresponding to the internal network address of the second client device, and sends an access request data packet to each of the at least one public network address corresponding to the internal network address of the second client device.

Step 506: When detecting that a target public network address of the second client device receives the access request data packet, the second client device obtains, by using the cloud server, the at least one public network address corresponding to the internal network address of the first client device, and returns a response data packet to each of the at least one public network address corresponding to the internal network address of the first client device, where the target public network address is one of the at least one public network address corresponding to the internal network address of the second client device.

Step 508: The first client device establishes a P2P connection to the second client device when detecting that the second client device returns the response data packet to a target public network address of the first client device, where the target public network address is one of the at least one public network address corresponding to the internal network address of the first client device.

According to the method for establishing a P2P connection provided in this application, a first client device may communicate with at least two auxiliary nodes, to obtain answer messages returned by the at least two auxiliary nodes; then, the first client device determines, based on the answer messages, at least one public network address corresponding to an internal network address of the first client device, registers, with a cloud server, the at least one public network address corresponding to the internal network address of the first client device, and monitors the at least one public network address corresponding to the internal network address of the first client device; and when detecting that a second client device returns a response data packet to a target public network address, the first client device establishes a P2P connection to the second client device, where the target public network address is one of the at least one public network address corresponding to the internal network address of the first client device. In this case, the at least one public network address corresponding to the internal network address of the first client device may be detected through communication between the first client device and the at least two auxiliary nodes, to determine whether there are a plurality of external public network addresses of the first client device. That is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

Figure 6:
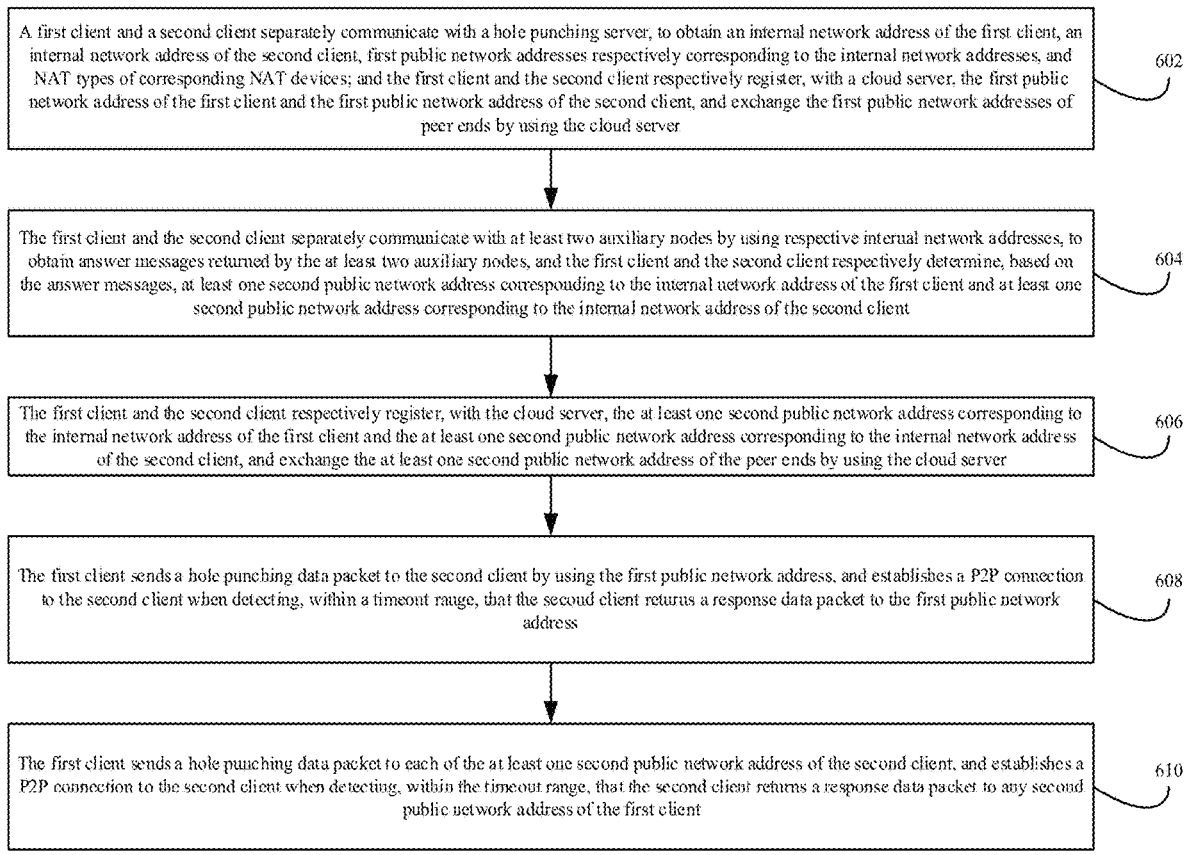
FIG. 6 is a flowchart of another method for establishing a P2P connection according to an embodiment of this application.

FIG. 6 is a flowchart of another method for establishing a P2P connection according to an embodiment of this application. The method specifically includes the following steps.

It should be noted that a complete process of establishing a P2P connection includes a NAT detection phase and a hole punching phase. The NAT detection phase includes conventional NAT detection and NAT detection that is performed by using at least two auxiliary nodes. The hole punching phase includes conventional hole punching and hole punching that is performed by using auxiliary nodes.

Step 602: A first client device and a second client device separately communicate with a hole punching server, to obtain an internal network address of the first client device, an internal network address of the second client device, first public network addresses respectively corresponding to the internal network addresses, and NAT types of corresponding NAT devices; and the first client device and the second client device respectively register, with a cloud server, the first public network address of the first client device and the first public network address of the second client device, and exchange the first public network addresses of peer ends by using the cloud server.

It should be noted that the step 602 is a conventional detection phase in which the first client device and the second client device separately perform conventional NAT detection by using the hole punching server.

Step 604: The first client device and the second client device separately communicate with at least two auxiliary nodes by using respective internal network addresses, to obtain answer messages returned by the at least two auxiliary nodes, and the first client device and the second client device respectively determine, based on the answer messages, at least one second public network address corresponding to the internal network address of the first client device and at least one second public network address corresponding to the internal network address of the second client device.

It should be noted that the step 604 is that the first client device and the second client device separately perform NAT detection by using at least two auxiliary nodes.

Step 606: The first client device and the second client device respectively register, with the cloud server, the at least one second public network address corresponding to the internal network address of the first client device and the at least one second public network address corresponding to the internal network address of the second client device, and exchange the at least one second public network address of the peer ends by using the cloud server.

Step 608: The first client device sends a hole punching data packet to the second client device by using the first public network address, and establishes a P2P connection to the second client device when detecting, within a timeout range, that the second client device returns a response data packet to the first public network address.

It should be noted that the first public network address is a public network address obtained by using the hole punching server, that is, the first public network address is a conventionally detected public network address. Therefore, step 606 is a conventional hole punching operation.

Step 610: The first client device sends a hole punching data packet to each of the at least one second public network address of the second client device, and establishes a P2P connection to the second client device when detecting, within the timeout range, that the second client device returns a response data packet to any second public network address of the first client device.

It should be noted that the second public network address is a public network address obtained by using the at least two auxiliary nodes. Therefore, the step 610 is a hole punching operation performed by using auxiliary nodes.

According to the method for establishing a P2P connection provided in this application, at least one public network address corresponding to an internal network address of a client device may be further detected by using at least two auxiliary nodes based on conventional detection, to determine whether there are a plurality of external public network addresses of the client device. That is, the public network address corresponding to the internal network address of the client device may be more accurately detected by using the at least two auxiliary nodes, so that a success rate of hole punching between client devices corresponding to a plurality of public network addresses is improved, and P2P connection establishment with a high success rate is implemented.

Figure 7:
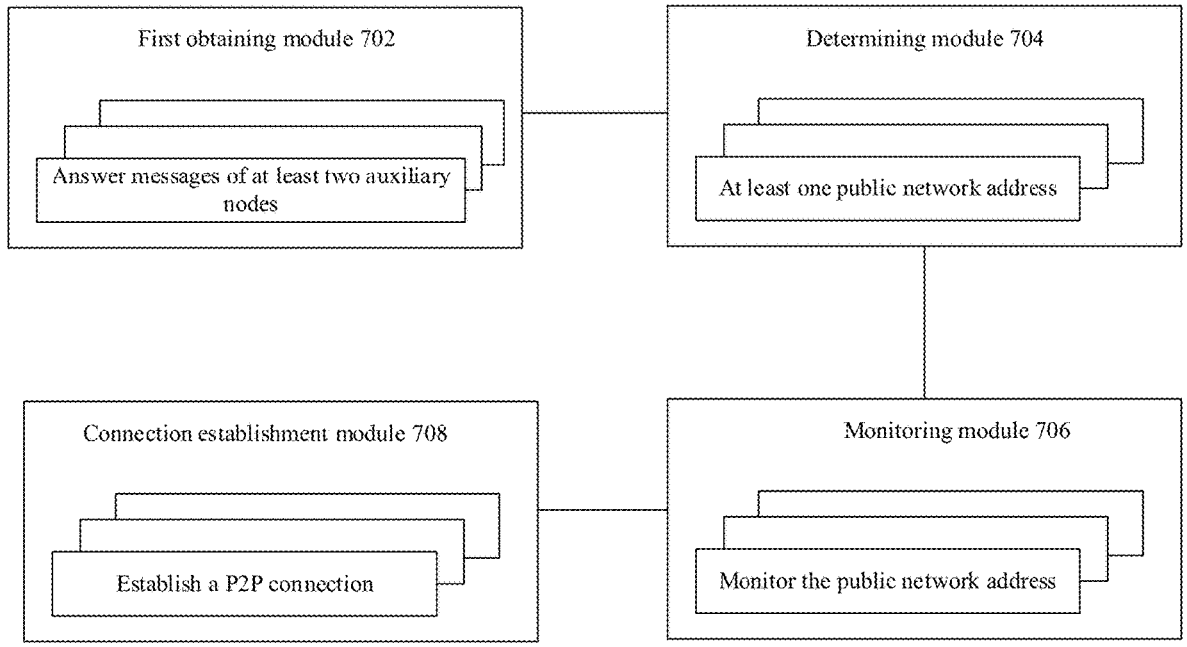
FIG. 7 is a schematic diagram of a structure of a client device according to an embodiment of this application.

Corresponding to the foregoing method embodiments, this application further provides an embodiment of a client device. FIG. 7 is a schematic diagram of a structure of a client device according to an embodiment of this application. As shown in FIG. 7, the apparatus includes:

a first obtaining module 702, configured to communicate with at least two auxiliary nodes, to obtain answer messages returned by the at least two auxiliary nodes;

a determining module 704, configured to determine, based on the answer messages, at least one public network address corresponding to an internal network address of a first client device;

a monitoring module 706, configured to register, with a cloud server, the at least one public network address corresponding to the internal network address of the first client device, and monitor the at least one public network address corresponding to the internal network address of the first client device; and a connection establishment module 708, configured to establish a P2P connection to a second client device when detecting that the second client device returns a response data packet to a target public network address, where the target public network address is one of the at least one public network address corresponding to the internal network address of the first client device.

Optionally, the apparatus further includes:

a second obtaining module, configured to communicate with a traversal auxiliary server, to obtain the internal network address and a NAT type of a corresponding NAT device; and a storage module, configured to locally store the internal network address and the NAT type of the corresponding NAT device.

Optionally, the determining module 704 is further configured to:

when the NAT type of the NAT device corresponding to the second client device is a port restricted cone, determine, based on the answer messages, at least one public network IP address corresponding to the internal network address of the first client device;

determine, for each of the at least one public network IP address, at least one public network port corresponding to the public network IP address; determine, based on the at least one public network port, an estimated public network port corresponding to the public network IP address; and combine the estimated public network port and the public network IP address into the public network address.

Optionally, the determining module 704 is further configured to:

determine a first public network port with a largest port identifier and a second public network port with a smallest port identifier in the at least one public network port;

determine a start port identifier and an end port identifier based on the first public network port and the second public network port; and determine a public network port between the start port identifier and the end port identifier as the estimated public network port.

Optionally, the determining module 704 is further configured to:
add a preset threshold to the port identifier of the first public network port, to obtain the end port identifier; and
subtract the preset threshold from the port identifier of the second public network port, to obtain the start port identifier.

Optionally, the monitoring module 706 is further configured to:
register, with the cloud server, the at least one public network address corresponding to the internal network address of the first client device and the NAT type of the corresponding NAT device.

Optionally, the first obtaining module 702 is further configured to:
send a detection assistance request to the at least two auxiliary nodes by using the internal network address of the first client device; and
receive the answer messages returned by the at least two auxiliary nodes in response to the detection assistance request.

Optionally, the determining module 704 is further configured to:
determine, for each of the at least two auxiliary nodes, a public network IP address corresponding to the answer message returned by the auxiliary node; and
perform a deduplication operation on the public network IP address corresponding to the answer message, to determine the at least one public network IP address corresponding to the internal network address of the first client device.

Optionally, the apparatus further includes:
a third obtaining module, configured to obtain, by using the cloud server, at least one public network address corresponding to an internal network address of the second client device, where the at least one public network address corresponding to the internal network address of the second client device is a public network address determined by the second client device by using the at least two auxiliary nodes; and
a sending module, configured to send an access request data packet to each of the at least one public network address corresponding to the internal network address of the second client device.

Optionally, the public network address includes one public network IP address and at least one public network port. The sending module is further configured to:
obtain, by using the cloud server, a NAT type of a NAT device corresponding to the second client device;
when the NAT type is a port restricted cone, determine, for each of the at least one public network address, a quantity of public network ports included in the public network address;
when the public network address includes at least two public network ports, form at least two address port pairs by using each of the at least two public network ports and the public network IP address that are included in the public network address; and
send the access request data packet to each of the address port pairs.

Optionally, the third obtaining module is further configured to:
send a connection establishment assistance request to the cloud server; and
receive at least one public network address that corresponds to the internal network address of the second client device and that is returned by the cloud server in response to the connection establishment assistance request.

The client device provided in this application may communicate with at least two auxiliary nodes, to obtain answer messages returned by the at least two auxiliary nodes; then, the client device determines, based on the answer messages, at least one public network address corresponding to an internal network address of the first client device, registers, with a cloud server, the at least one public network address corresponding to the internal network address of the first client device, and monitors the at least one public network address corresponding to the internal network address of the first client device; and when detecting that a second client device returns a response data packet to a target public network address, the client device establishes a P2P connection to the second client device, where the target public network address is one of the at least one public network address corresponding to the internal network address of the first client device. In this case, the at least one public network address corresponding to the internal network address of the first client device may be detected through communication between the first client device and the at least two auxiliary nodes, to determine whether there are a plurality of external public network addresses of the first client device. That is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

The foregoing describes a schematic solution of a client device in this embodiment. It should be noted that the technical solution of the client device belongs to a same concept as the technical solution of the foregoing method for establishing a P2P connection. For details not described in the technical solution of the client device, refer to the description of the technical solution of the foregoing method for establishing a P2P connection.

Figure 8:
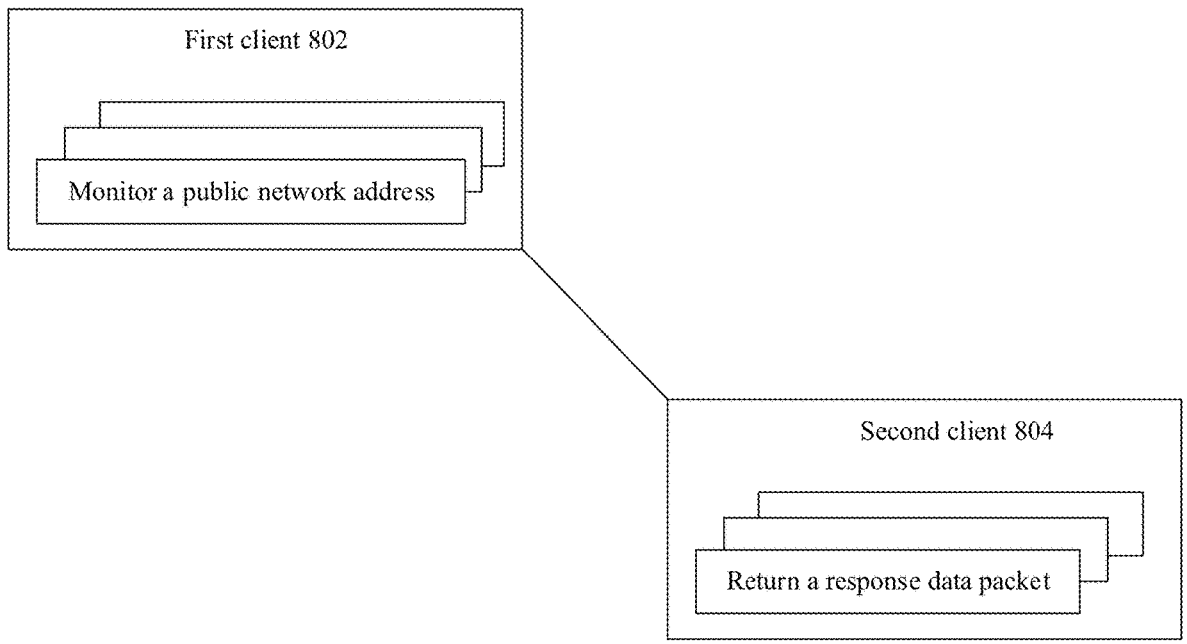
FIG. 8 is a schematic diagram of a structure of a system for establishing a P2P connection according to an embodiment of this application.

Corresponding to the foregoing method embodiments, this application further provides an embodiment of a system for establishing a P2P connection. FIG. 8 is a schematic diagram of a structure of a system for establishing a P2P connection according to an embodiment of this application. As shown in FIG. 8, the system includes a first client device 802 and a second client device 804.

The first client device 802 and the second client device 804 are configured to: separately communicate with at least two auxiliary nodes, to obtain answer messages returned by the at least two auxiliary nodes; determine, based on the answer messages, at least one public network address corresponding to an internal network address of the first client device and at least one public network address corresponding to an internal network address of the second client device; and register, with a cloud server, the at least one public network address corresponding to the internal network address of the first client device and the at least one public network address corresponding to the internal network address of the second client device, and monitor the at least one public network address.

The first client device 802 is further configured to obtain, by using the cloud server, the at least one public network address corresponding to the internal network address of the second client device, and send an access request data packet to each of the at least one public network address corresponding to the internal network address of the second client device.

The second client device 804 is further configured to, when detecting that a target public network address of the second client device receives the access request data packet, obtain, by using the cloud server, the at least one public network address corresponding to the internal network address of the first client device, and return a response data packet to each of the at least one public network address corresponding to the internal network address of the first client device, where the target public network address is one of the at least one public network address corresponding to the internal network address of the second client device.

The first client device 802 is further configured to establish a P2P connection to the second client device when detecting that the second client device returns the response data packet to a target public network address of the first client device, where the target public network address is one of the at least one public network address corresponding to the internal network address of the first client device.

Optionally, the first client device 802 and the second client device 804 are further configured to:
separately communicate with a traversal auxiliary server, to obtain the internal network address of the first client device, the internal network address of the second client device, a NAT type of a NAT device corresponding to the first client device, and a NAT type of a NAT device corresponding to the second client device; and
locally store the internal network address of the first client device, the internal network address of the second client device, the NAT type of the NAT device corresponding to the first client device, and the NAT type of the NAT device corresponding to the second client device.

Optionally, the first client device 802 and the second client device 804 are further configured to:
register, with the cloud server, the at least one public network address corresponding to the internal network address of the first client device, the at least one public network address corresponding to the internal network address of the second client device, the NAT type of the NAT device corresponding to the first client device, and the NAT type of the NAT device corresponding to the second client device.

According to the system for establishing a P2P connection provided in this application, the first client device may communicate with at least two auxiliary nodes, to obtain answer messages returned by the at least two auxiliary nodes; then, the first client device determines, based on the answer messages, at least one public network address corresponding to the internal network address of the first client device, registers, with the cloud server, the at least one public network address corresponding to the internal network address of the first client device, and monitors the at least one public network address corresponding to the internal network address of the first client device; and when detecting that the second client device returns a response data packet to a target public network address, the first client device establishes a P2P connection to the second client device, where the target public network address is one of the at least one public network address corresponding to the internal network address of the first client device. In this case, the at least one public network address corresponding to the internal network address of the first client device may be detected through communication between the first client device and the at least two auxiliary nodes, to determine whether there are a plurality of external public network addresses of the first client device. That is, the public network address corresponding to the internal network address of the first client device may be more accurately detected by using the at least two auxiliary nodes, so that a success rate of hole punching between client devices corresponding to a plurality of public network addresses is improved, and P2P connection establishment with a high success rate is implemented.

The foregoing describes a schematic solution of the system for establishing a P2P connection in this embodiment. It should be noted that the technical solution of the system for establishing a P2P connection belongs to a same concept as the technical solution of the foregoing method for establishing a P2P connection. For details not described in the technical solution of the system for establishing a P2P connection, refer to the description of the technical solution of the foregoing method for establishing a P2P connection.

Figure 9:
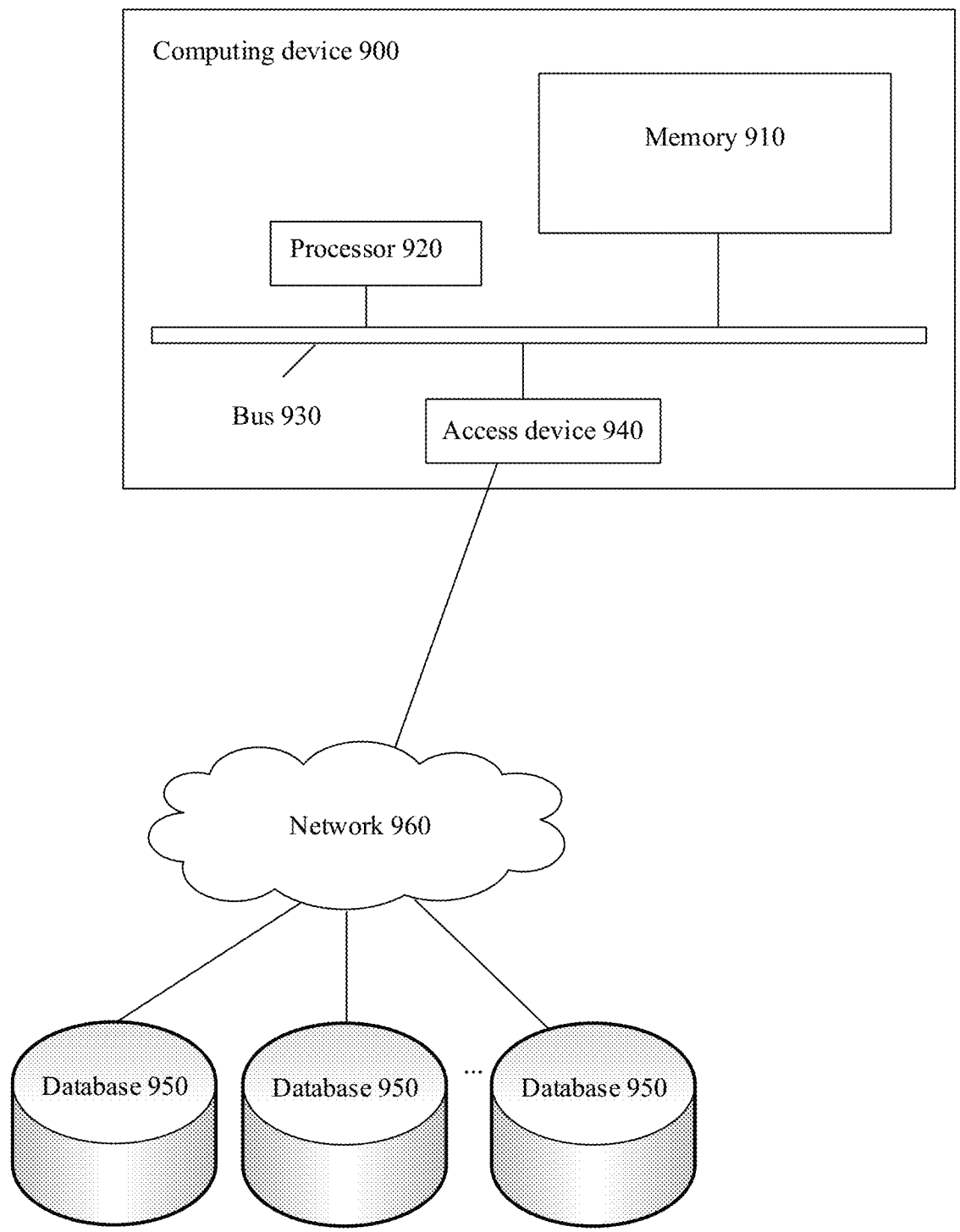
FIG. 9 is a block diagram of a structure of a computing device according to an embodiment of this application.

FIG. 9 is a block diagram of a structure of a computing device 900 according to an embodiment of this application. Components of the computing device 900 include, but are not limited to, a memory 910 and a processor 920. The processor 920 and the memory 910 are connected by using a bus 930, and a database 950 is configured to store data.

The computing device 900 further includes an access device 940, and the access device 940 enables the computing device 900 to communicate via one or more networks 960. Examples of these networks include a public switched telephone network (PSTN), a local area network (LAN), a wide area network (WAN), a personal area network (PAN), or a combination of communication networks such as the Internet. The access device 940 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 900 and other components not shown in FIG. 9 may alternatively be connected to each other, for example, by using the bus. It should be understood that the block diagram of the structure of the computing device shown in FIG. 9 is for the purpose of illustration only, and not for limiting the scope of this application. A person skilled in the art can add or replace other components as required.

The computing device 900 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 900 may alternatively be a mobile or stationary server.

The processor 920 is configured to execute the following computer-executable instructions:
communicating with at least two auxiliary nodes, to obtain answer messages returned by the at least two auxiliary nodes;

determining, based on the answer messages, at least one public network address corresponding to an internal network address of a first client device;

registering, with a cloud server, the at least one public network address corresponding to the internal network address of the first client device, and monitoring the at least one public network address corresponding to the internal network address of the first client device; and establishing a P2P connection to a second client device when detecting, in preset duration, that the second client device returns a response data packet to a target public network address, where the target public network address is one of the at least one public network address corresponding to the internal network address of the first client device.

The foregoing describes a schematic solution of the computing device in this embodiment. It should be noted that the technical solution of the computing device belongs to a same concept as the technical solution of the foregoing method for establishing a P2P connection. For details not described in the technical solution of the computing device, refer to the description of the technical solution of the foregoing method for establishing a P2P connection.

An embodiment of this application further provides a computer-readable storage medium. The computer-readable storage medium stores computer instructions, and the instructions are executed by a processor to perform the following operations:

communicating with at least two auxiliary nodes, to obtain answer messages returned by the at least two auxiliary nodes;

determining, based on the answer messages, at least one public network address corresponding to an internal network address of a first client device;

registering, with a cloud server, the at least one public network address corresponding to the internal network address of the first client device, and monitoring the at least one public network address corresponding to the internal network address of the first client device; and establishing a P2P connection to a second client device when detecting, in preset duration, that the second client device returns a response data packet to a target public network address, where the target public network address is one of the at least one public network address corresponding to the internal network address of the first client device.

The foregoing describes a schematic solution of the computer-readable storage medium in this embodiment. It should be noted that the technical solution of the storage medium belongs to a same concept as the technical solution of the foregoing method for establishing a P2P connection. For details not described in the technical solution of the storage medium, refer to the description of the technical solution of the foregoing method for establishing a P2P connection.

Specific embodiments of this specification are described above. Other embodiments are within the scope of the appended claims. In some cases, actions or steps described in the claims may be performed in a sequence different from those in the embodiments and desired results may still be achieved. In addition, processes described in the accompanying drawings do not necessarily require a specific order or a sequential order shown to achieve the desired results. In some implementations, multitasking and parallel processing are also possible or may be advantageous.

The computer instructions include computer program code, and the computer program code may be in a source code form or an object code form, may be an executable file, may be in some intermediate forms, or the like. The computer-readable medium may include: any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunication signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all example embodiments, and used actions and modules are not necessarily mandatory to this application.

In the foregoing embodiments, the descriptions of various embodiments have respective focuses. For a part that is not described in detail in an embodiment, reference may be made to related descriptions in other embodiments.

The example embodiments of this application disclosed above are merely intended to help describe this application. The optional embodiments do not describe all the details in detail, nor do they limit the present invention to the specific implementations described. Clearly, many modifications and variations may be made based on the content of this application. These embodiments are selected and specifically described in this application to better explain the principle and the actual applications of this application, so that a person skilled in the art can well understand and use this application. This application is only subject to the claims and a full scope and equivalents thereof.

What is claimed is:

1. A method for establishing a peer to peer (P2P) connection, applied to a first client device, comprising:

communicating with at least two auxiliary nodes, to obtain answer messages returned by the at least two auxiliary nodes;

determining, based on the answer messages, at least one public network address corresponding to an internal network address of the first client device;

registering, with a cloud server, the at least one public network address corresponding to the internal network address of the first client device, and monitoring the at least one public network address corresponding to the internal network address of the first client device; and establishing a P2P connection to a second client device in response to detecting, in a preset duration, that the second client device returns a response data packet to a target public network address, wherein the target public network address is one of the at least one public network address corresponding to the internal network address of the first client device.

2. The method for establishing a P2P connection according to claim 1, before the communicating with at least two auxiliary nodes, to obtain answer messages returned by the at least two auxiliary nodes, further comprising:

communicating with a traversal auxiliary server, to obtain the internal network address of the first client device and a network address translation (NAT) type of a NAT device corresponding to the first client device; and locally storing the internal network address of the first client device and the NAT type of the NAT device corresponding to the first client device.

3. The method for establishing a P2P connection according to claim 1, wherein the determining, based on the answer messages, at least one public network address corresponding to an internal network address of the first client device comprises:

when a NAT type of a NAT device corresponding to the first client device is a port restricted cone, determining, based on the answer messages, at least one public network IP address corresponding to the internal network address of the first client device;

determining, for each of the at least one public network IP address, at least one public network port corresponding to each public network IP address;

determining, based on the at least one public network port, an estimated public network port corresponding to each public network IP address; and combining the estimated public network port and a corresponding public network IP address into a public network address.

4. The method for establishing a P2P connection according to claim 3, wherein the determining, based on the at least one public network port, an estimated public network port corresponding to each public network IP address comprises:

determining a first public network port with a largest port identifier and a second public network port with a smallest port identifier in the at least one public network port;

determining a start port identifier and an end port identifier based on the first public network port and the second public network port; and determining a public network port between the start port identifier and the end port identifier as the estimated public network port.

5. The method for establishing a P2P connection according to claim 4, wherein the determining a start port identifier and an end port identifier based on the first public network port and the second public network port comprises:

adding a preset threshold to the port identifier of the first public network port, to obtain the end port identifier; and subtracting the preset threshold from the port identifier of the second public network port, to obtain the start port identifier.

6. The method for establishing a P2P connection according to claim 1, wherein the registering, with a cloud server, the at least one public network address corresponding to the internal network address of the first client device comprises:

registering, with the cloud server, the at least one public network address corresponding to the internal network address of the first client device and a NAT type of a NAT device corresponding to the first client device.

7. The method for establishing a P2P connection according to claim 1, wherein the communicating with at least two auxiliary nodes, to obtain answer messages returned by the at least two auxiliary nodes comprises:

sending a detection assistance request to the at least two auxiliary nodes by using the internal network address of the first client device; and receiving the answer messages returned by the at least two auxiliary nodes in response to the detection assistance request.

8. The method for establishing a P2P connection according to claim 3, wherein the determining, based on the answer messages, at least one public network IP address corresponding to the internal network address of the first client device comprises:

determining, for each of the at least two auxiliary nodes, a public network IP address corresponding to the answer message returned by each auxiliary node; and performing a deduplication operation on the public network IP address corresponding to the answer message returned by each auxiliary node, to determine the at least one public network IP address corresponding to the internal network address of the first client device.

9. The method for establishing a P2P connection according to claim 1, after the registering, with a cloud server, the at least one public network address corresponding to the internal network address of the first client device, further comprising:

obtaining, via the cloud server, at least one public network address corresponding to an internal network address of the second client device, wherein the at least one public network address corresponding to the internal network address of the second client device is a public network address determined by the second client device by using at least two auxiliary nodes; and sending an access request data packet to each of the at least one public network address corresponding to the internal network address of the second client device.

10. The method for establishing a P2P connection according to claim 9, wherein the public network address comprises one public network IP address and at least one public network port; and wherein the sending an access request data packet to each of the at least one public network address corresponding to the internal network address of the second client device comprises:

obtaining, via the cloud server, a NAT type of a NAT device corresponding to the second client device;

when the NAT type of the NAT device corresponding to the second client device is a port restricted cone, determining, for each of the at least one public network address, a quantity of public network ports comprised in each public network address;

when the public network address comprises at least two public network ports, forming at least two address port pairs by using each of the at least two public network ports and the public network IP address that are comprised in the public network address; and sending the access request data packet to each of the address port pairs.

11. The method for establishing a P2P connection according to claim 9, wherein the obtaining, via the cloud server, at least one public network address corresponding to an internal network address of the second client device comprises:

sending a connection establishment assistance request to the cloud server; and receiving at least one public network address that corresponds to the internal network address of the second client device and that is returned by the cloud server in response to the connection establishment assistance request.

12. A method for establishing a peer to peer (P2P) connection, comprising:
respectively communicating, by a first client device and a second client device, with at least two auxiliary nodes, to obtain answer messages returned by the respective at least two auxiliary nodes;
determining, based on the answer messages, at least one public network address corresponding to an internal network address of the first client device and at least one public network address corresponding to an internal network address of the second client device;
registering, with a cloud server, the at least one public network address corresponding to the internal network address of the first client device and the at least one public network address corresponding to the internal network address of the second client device, and monitoring the respective at least one public network address;
obtaining, by the first client device via the cloud server, the at least one public network address corresponding to the internal network address of the second client device, and sending an access request data packet to each of the at least one public network address corresponding to the internal network address of the second client device;
in response to detecting that a target public network address of the second client device receives the access request data packet, obtaining, by the second client device via the cloud server, the at least one public network address corresponding to the internal network address of the first client device, and returning a response data packet to each of the at least one public network address corresponding to the internal network address of the first client device, wherein the target public network address of the second client device is one of the at least one public network address corresponding to the internal network address of the second client device; and
establishing, by the first client device, a P2P connection to the second client device in response to detecting that the second client device returns the response data packet to a target public network address of the first client device, wherein the target public network address of the first client device is one of the at least one public network address corresponding to the internal network address of the first client device.

13. The method for establishing a P2P connection according to claim 12, before the separately communicating, by a first client device and a second client device, with at least two auxiliary nodes, to obtain answer messages returned by the respective at least two auxiliary nodes, further comprising:
separately communicating, by the first client device and the second client device, with a traversal auxiliary server, to obtain the internal network address of the first client device, the internal network address of the second client device, a network address translation (NAT) type of a NAT device corresponding to the first client device, and a NAT type of a NAT device corresponding to the second client device; and
locally storing, by the first client device and the second client device, the respective internal network addresses and the NAT types of the corresponding NAT devices.

14. The method for establishing a P2P connection according to claim 12, wherein respectively registering, by the first client device and the second client device with a cloud server, the at least one public network address corresponding to the internal network address of the first client device and the at least one public network address corresponding to the internal network address of the second client device comprises:
registering, with the cloud server, the at least one public network address corresponding to the internal network address of the first client device, the NAT type of the NAT device corresponding to the first client device, the at least one public network address corresponding to the internal network address of the second client device, and the NAT type of the NAT device corresponding to the second client device.

15. A computing device, comprising:
a memory and a processor, wherein
the memory is configured to store computer-executable instructions, and the processor is configured to execute the computer-executable instructions to implement operations comprising:
communicating with at least two auxiliary nodes, to obtain answer messages returned by the at least two auxiliary nodes;
determining, based on the answer messages, at least one public network address corresponding to an internal network address of a first client device;
registering, with a cloud server, the at least one public network address corresponding to the internal network address of the first client device, and monitoring the at least one public network address corresponding to the internal network address of the first client device; and
establishing a peer to peer (P2P) connection to a second client device in response to detecting that the second client device returns a response data packet to a target public network address, wherein the target public network address is one of the at least one public network address corresponding to the internal network address of the first client device.

16. The computing device according to claim 15, wherein before the communicating with at least two auxiliary nodes, to obtain answer messages returned by the at least two auxiliary nodes, the operations further comprise:
communicating with a traversal auxiliary server, to obtain the internal network address of the first client device and a network address translation (NAT) type of a NAT device corresponding to the first client device; and
locally storing the internal network address of the first client device and the NAT type of the NAT device corresponding to the first client device.

17. The computing device according to claim 15, wherein the determining, based on the answer messages, at least one public network address corresponding to an internal network address of the first client device further comprises:
when a NAT type of a NAT device corresponding to the first client device is a port restricted cone, determining, based on the answer messages, at least one public network IP address corresponding to the internal network address of the first client device;
determining, for each of the at least one public network IP address, at least one public network port corresponding to each public network IP address;
determining, based on the at least one public network port, an estimated public network port corresponding to each public network IP address; and
combining the estimated public network port and a corresponding public network IP address into a public network address.

18. The computing device according to claim 15, wherein the registering, with a cloud server, the at least one public network address corresponding to the internal network address of the first client device comprises:
  registering, with the cloud server, the at least one public network address corresponding to the internal network address of the first client device and a NAT type of a NAT device corresponding to the first client device.

19. The computing device according to claim 15, wherein after the registering, with a cloud server, the at least one public network address corresponding to the internal network address of the first client device, the operations further comprise:
  obtaining, via the cloud server, at least one public network address corresponding to an internal network address of the second client device, wherein the at least one public network address corresponding to the internal network address of the second client device is a public network address determined by the second client device by using at least two auxiliary nodes; and
  sending an access request data packet to each of the at least one public network address corresponding to the internal network address of the second client device.

20. The computing device according to claim 19, wherein the public network address comprises one public network IP address and at least one public network port; and wherein the sending an access request data packet to each of the at least one public network address corresponding to the internal network address of the second client device comprises:
  obtaining, via the cloud server, a NAT type of a NAT device corresponding to the second client device;
  when the NAT type of the NAT device corresponding to the second client device is a port restricted cone, determining, for each of the at least one public network address, a quantity of public network ports comprised in each public network address;
  when the public network address comprises at least two public network ports, forming at least two address port pairs by using each of the at least two public network ports and the public network IP address that are comprised in the public network address; and
  sending the access request data packet to each of the address port pairs.

* * * * *